United States Patent [19]
Laine et al.

[11] Patent Number: 5,024,263
[45] Date of Patent: Jun. 18, 1991

[54] METHOD AND APPARATUS FOR THE CONTROL OF AIR FLOWS AND PRESSURES IN AIR-CONDITIONING

[75] Inventors: Juhani Laine; Mikko Nyman, both of Helsinki; Tapio Paananen, Lohja, all of Finland

[73] Assignee: Ilmatera OY, Kaunianen, Finland

[21] Appl. No.: 382,706

[22] PCT Filed: Dec. 16, 1988

[86] PCT No.: PCT/FI88/00199
§ 371 Date: Sep. 18, 1989
§ 102(e) Date: Sep. 18, 1989

[87] PCT Pub. No.: WO89/05947
PCT Pub. Date: Jun. 29, 1989

[30] Foreign Application Priority Data
Dec. 18, 1987 [FI] Finland ................... 875613

[51] Int. Cl.$^5$ .................. F24F 11/02; F24F 11/04; F24D 5/00
[52] U.S. Cl. .......................... 165/1; 165/16; 165/39; 165/40; 165/54
[58] Field of Search .............. 165/16, 39, 40, 54, 165/66, 1

[56] References Cited

U.S. PATENT DOCUMENTS

| | | | |
|---|---|---|---|
| 3,653,590 | 4/1972 | Elsea . | |
| 4,228,849 | 10/1980 | Heinola | 165/16 |
| 4,375,224 | 3/1983 | Noll . | |
| 4,407,185 | 10/1983 | Haines et al. | 165/16 |
| 4,428,529 | 1/1984 | Bentsen . | |
| 4,437,608 | 3/1984 | Smith | 165/16 |
| 4,491,061 | 1/1985 | Nishizawa et al. | 165/16 |
| 4,512,387 | 4/1985 | Rodriguez et al. | 165/40 |
| 4,517,810 | 5/1985 | Foley et al. | 165/16 |
| 4,653,574 | 3/1987 | Quinlisk et al. | 165/54 |
| 4,750,544 | 6/1988 | Halsne | 165/16 |
| 4,841,733 | 6/1989 | Dussault et al. | 165/16 |

FOREIGN PATENT DOCUMENTS

| | | | |
|---|---|---|---|
| 0159861 | 10/1985 | European Pat. Off. . | |
| 0160437 | 11/1985 | European Pat. Off. . | |
| 3144276 | 9/1982 | Fed. Rep. of Germany | 165/54 |
| 3201605 | 9/1982 | Fed. Rep. of Germany . | |
| 61563 | 4/1982 | Finland . | |
| 0145895 | 8/1983 | Japan | 165/40 |
| 151638 | 1/1985 | Norway . | |
| WO81/01455 | 5/1981 | PCT Int'l Appl. . | |
| 454461 | 3/1988 | Sweden . | |
| 0909462 | 2/1982 | U.S.S.R. | 165/54 |

*Primary Examiner*—John Ford
*Attorney, Agent, or Firm*—Spensley Horn Jubas & Lubitz

[57] ABSTRACT

The invention relates to a method and apparatus for controlling the fresh-air, input-air, exhaust-air, waste-air and return-air flows, as well as the air pressure in the input-air duct and the air pressure in the exhaust-air duct, in an air-conditioning system which comprises at least input-air and waste-air flow meters (6, 20), input-air and exhaust-air pressure meters (12, 19), an input-air fan (5) with its air-flow control (13), a waste-air or exhaust-air fan (18) with its air-flow control (14), a fresh-air flow meter (15), a heat recovery exchanger (4), closing and control mechanisms for exhaust air and return air, coupled together as an outlet-air mechanism (10), and closing and control mechanisms for fresh air and fresh-air bypass, coupled together as an intake-air mechanism (3). The controls (13, 14) work together, and they have been fitted to act on the fans (5, 18) and mechanisms (3, 10) so that a change in one of the quanities measured will cause the adjustment of some air flow and/or mechanism (3, 10) so that the ratio (A/B) or difference (A-D) of certain air flows will be at the predetermined value, or/and that the bypass flow (F) will open or close.

16 Claims, 6 Drawing Sheets

METHOD AND APPARATUS FOR THE CONTROL OF AIR FLOWS AND PRESSURES IN AIR-CONDITIONING

An object of the invention is a method and apparatus for the control of the fresh-air, input-air, exhaust-air, waste-air and return-air flows, as well as of the air pressure in the input-air duct and the air pressure in the exhaust-air duct, in an air-conditioning system in which the closing and control mechanisms for the fresh air and fresh-air bypass in relation to the heat recovery exchanger are coupled to each other as an intake-air mechanism and, respectively, the closing and control mechanisms for the exhaust air and return air are coupled to each other as an outlet-air mechanism.

There are two basic types of air-conditioning systems: constant-flow systems and flow-rate controllable systems. The constant-flow systems usually have one or two different operating rates, typically 1/1 rate and ½ rate.

In the constant-flow systems, the air flow is not regulated at all after a certain basic setting. For this reason the air flow will change during use as the filters of the air-conditioning system become soiled, as the heating radiator becomes soiled owing to the oil condensed on the cooling radiator, and as the heat recovery exchanger freezes. The air flow will also change owing to, for example, the thermal forces caused in the air-conditioning ducts by the temperature difference between the fresh air and the inside air, or by wind. Also, the air flow in a constant-flow system is not adjusted according to pressure changes in the duct system. Thus the air flows of the air-conditioning plant vary depending on the season of the year, the condition of the filters, and the shape of the characteristic curves of the fans and the duct system. The fresh-air flow and the waste-air flow vary independently of each other.

Flow-rate controllable systems are nowadays always connected with a flow-rate controllable air-conditioning system. The objective of the control is to maintain a constant pressure in the ducts. The pressure in the duct system is measured, and on the basis of this measurement the air flow in the air-conditioning plant is adjusted according to need. The fresh-air flow and the waste-air flow in the air-conditioning system vary independently of each other.

The air flows in present-day air-conditioning systems change readily when, for example, the filters become soiled or the heat recovery device freezes. The fresh-air flow and the waste-air flow change independently of each other, whereupon the pressure relations between the different parts of the building will change. The greatest disadvantage is undoubtedly the changing of the fresh-air flow and the waste-air flow independently of each other. As a consequence of this, humidity present in the indoor air in the building may condense on windows and structures, causing structural damage. Furthermore, spreading of odors around the building and drafts may also result.

By the method according to an embodiment of the invention, a crucial remedy is obtained for the disadvantages described above. In order to achieve this, the method according to an embodiment the invention is characterized in that the control of fresh-air, input-air, exhaust-air, waste-air and return-air flows (A, B, C, D and E, respectively) and of pressure in an input-air duct and of pressure in an exhaust-air duct are interconnected in such a way that a deviation from a predetermined value in one of these will cause a change of predetermined values in the others so that the difference (A-D) between the fresh-air flow and the waste-air flow, or their ratio (A/D), will change in a predetermined way. The apparatus according to an embodiment of the invention is characterized in that fresh-air flow and input-air flow meters and an input-air duct air pressure meter are connected to an input-air flow control and a waste-air flow meter and an exhaust-air duct air pressure meter are connected to a waste-air flow control, and that these control work together and are fitted to act on fans and outlet-air and intake-air mechanisms so that a change in one of the quantities measured will cause an adjustment of the input-air flow (B), the waste-flow (D), the outlet air mechanism and/or the intake-air mechanism so that ratio (A/B) of the fresh-air flow to the input-air flow and/or the difference (A-D) between the fresh-air flow and the waste-air flow, or their ratio (A/D), will be at the predetermined values and/or that a fresh-air bypass flow (F) will open or close.

It can be regarded as the most important advantage of an embodiment of the invention that the fresh-air flow and the waste-air flow in the air-conditioning system can be controlled (adjusted or maintained constant) continuously and independently of each other. In addition, in the air-conditioning system according to an embodiment of the invention, the controls of the pressure in the input-air duct and the pressure in the exhaust-air duct are dependent both on each other and on the fresh-air flow and the waste-air flow. It is a further advantage that the system is simple in construction.

The invention is described below in detail, with reference to the accompanying drawing.

Figure 1:
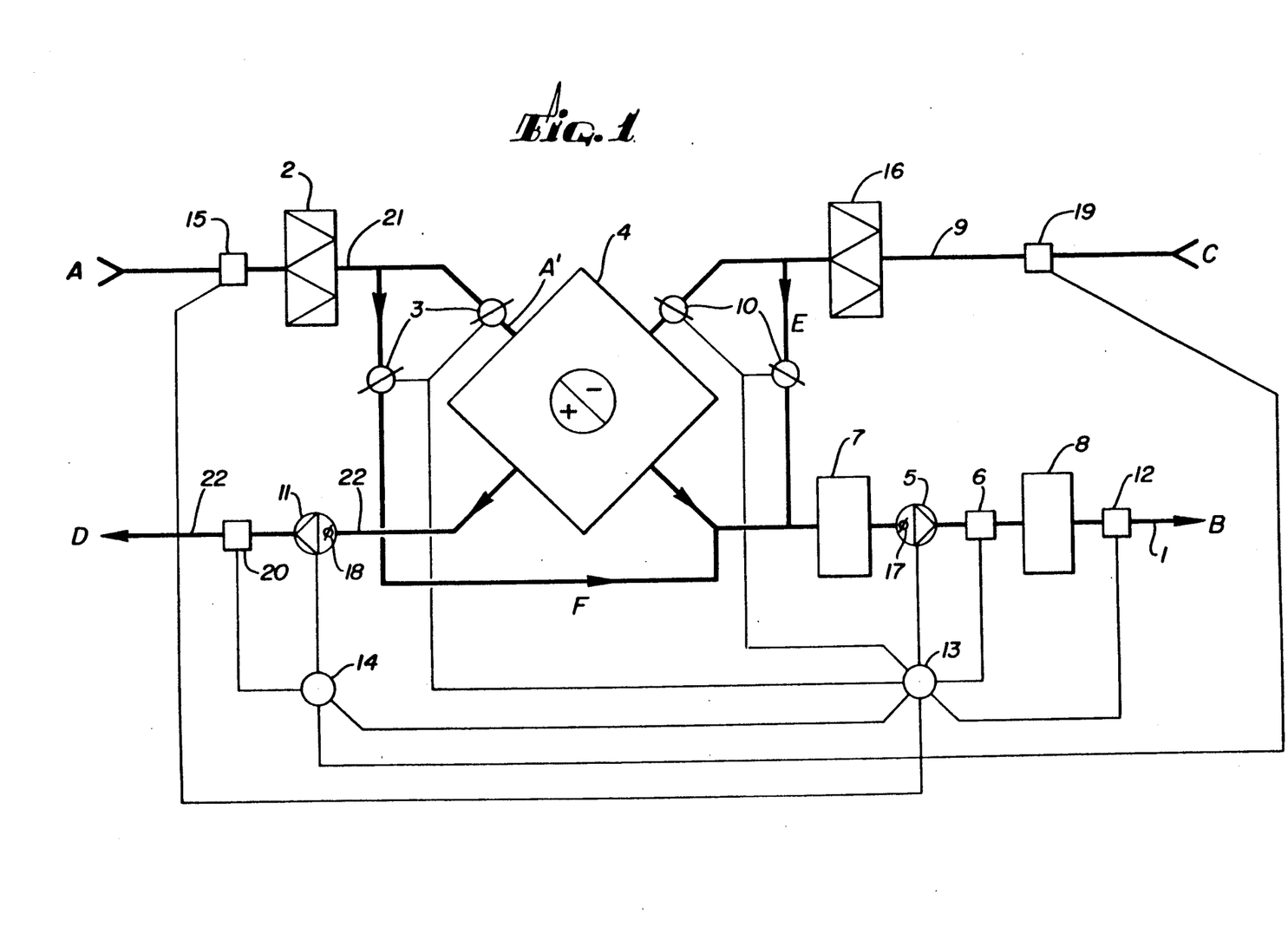
FIG. 1 is a schematic representation of air-conditioning plant in which the system according to an embodiment the invention has been installed.

The indications of the air flows are as follows: A is the fresh-air flow, B is the input-air flow, C is the exhaust-air flow, D is the waste-air flow, E is the return-air flow, F is the fresh-air bypass flow of the heat recovery exchanger, A' is the fresh-air flow entering the heat recovery exchanger.

The input-air side of an air-conditioning system often includes, for example, the following parts: a fresh-air filter 2 in the fresh-air duct 21; the closing and control mechanisms of the fresh-air bypass, coupled to each other as an intake-air mechanism 3; a heat recovery exchanger 4; an input-air fan 5, an input-air flow meter 6, an input-air pressure meter 12 in the input-air duct 1; a fresh-air flow meter 15; and various air-treatment devices such as a heating radiator, a cooling radiator, an air-humidifier, air filters 7, 8, etc., which may be located at different points on the input-air side of the air-conditioning system. Typically the input-air flow B in the duct 1 is equal to the fresh-air flow A in the duct 21.

The exhaust-air side of air-conditioning system often includes, for example, an exhaust-air filter 16 and an exhaust-air pressure meter 19 in the exhaust-air duct 9, exhaust-air and return-air closing and control mechanisms coupled to each other as an outlet-air mechanism 10, and a waste-air fan 11 and a waste-air flow meter 20 in the waste-air duct 22. Typically the exhaust-air flow C in the duct 9 is equal to the waste-air flow D in the duct 22.

The input-air fan 5, the intake-air mechanism 3 and the outlet-air mechanism 10 are regulated by control 13, and the waste-air fan 18 by control 14. The input-air flow meter 6, the input-air pressure meter 12, and the fresh-air flow meter 15 are connected to control 13, and the exhaust-air pressure meter 19 and the waste-air flow meter 20 are connected to control 14. In addition, controls 13 and 14 are connected to each other. The intake-air mechanism 3 and the outlet-air mechanism 10, linked with the heat recovery exchanger 4, are preferably of the construction discussed below with reference to FIGS. 2-6.

When the flow resistance on the input-air side 1 of the air-conditioning system for some reason increases, for example as the air filter becomes soiled, the air flow will decrease unless the input-air fan 5 is correspondingly controlled or unless the flow resistance of the input-air side is otherwise reduced correspondingly. The input-air fan 5 and the input-air flow control means 17 can be controlled by control 13 on the basis of either air-flow measurement 6 or pressure measurement 12. The measuring and the control are so arranged that an adjustment of the input-air fan 5 or of the input-air control means 17 will compensate precisely for the error caused by the disturbance factor. In terms of control technology, the basis for this compensation is either the difference A-D between the fresh-air flow and the waste-air flow or their ratio A/D; either one of these, or both of them in alternation, or a value somewhere between them is maintained either constant or at a predetermined level by control 13. When the air flow has, under the effect of the above-mentioned adjustment, reached its limit value, the decreasing of the input-air flow will continue as the air filter continues to become further soiled. At this time the control 13 of the input-air fan, in accordance with the invention, will control the control 14 of the waste-air fan and/or of the waste-air flow control means 18 in such a way that the predetermined difference or ratio of the input-air flow B and the exhaust-air flow C will remain constant, which is essential with respect to the air-conditioned indoor space. Since, when the return-air flow E is closed, the input-air flow B is at all times precisely equal to the fresh-air flow A, this also corresponds to the maintaining of the difference A-D between the fresh-air flow and the waste-air flow, or their ratio A/D, at the predetermined level.

The operation is similar if the flow resistance on the exhaust-air side 9 in the air-conditioning system for some reason increases, for example when the exhaust-air filter 16 becomes soiled, the heat recovery exchanger 4 freezes, the fire damper of the air duct system is triggered, etc. In such a case the control 14 of the waste-air fan or/and of the control means 18 of the waste-air flow will control the control 13 of the input-air fan or of the control means 17 of the input-air flow in such a way that the difference A-D between the fresh-air flow A and the waste-air flow D, or their ratio A/D, or a value somewhere between them will remain constant or at the predetermined value.

When the waste-air flow D decreases to a value lower than the predetermined value, and the outside temperature is at the same time lower than the predetermined value, the intake-air mechanism 3 adjusts to a position in which the fresh-air flow A in its entirety is fresh-air bypass flow F, i.e. the fresh-air flow A' through the heat recovery exchanger is cut off. As a consequence of this, the waste-air flow begins to thaw the heat recovery exchanger 4, if this has frozen. When the waste-air flow has risen back to its predetermined value and/or the predetermined time has elapsed from the cutting off of the air-flow A', the intake-air mechanism 3 will switch back to its initial position, in which there is no fresh-air bypass flow F. This chain of steps can be repeated a predetermined number of times, typically 2-3 times. If the waste-air flow has not thereby risen back to its predetermined value, an alarm signal of an error operation will be given.

When it is desired to change the fresh-air flow A to be smaller than the input-air flow B, and a predetermined (ratio A/B is desired as their ratio, part of the exhaust-air flow C is directed by means of the outlet-air mechanism 10 as a return-air flow E to serve as input air B. In this case, after a changing of the position of the outlet-air mechanism 10, the input-air flow B or the pressure in the input-air duct 1 is adjusted to a predetermined value. Thereafter the waste-air fan 11 or the waste-air flow control means 18 is adjusted so that the difference A-D between the measured values of the fresh-air flow and the waste-air flow, or their ratio A/D, will become the predetermined constant value. If thereafter the input-air flow B or the pressure in the input-air duct 1 does not deviate from the predetermined value by more than a predetermined value, the ratio A/B of the fresh-air flow to the input-air flow will be compared to the predetermined ratio. This chain of steps is repeated in the order presented, or in part, until the input-air flow B, the ratio A/B of the fresh-air flow to the input-air flow and at the same time the difference A-D between the fresh-air flow and the waste-air flow, or their ratio A/D, reach their predetermined values. Thus the outlet-air mechanism 10 and thereby the return-air flow E may be for the control steps a starting point which has first been set according to other criteria, or alternatively the outlet-air mechanism can be used as a control means for achieving the desired fresh-air to input-air ratio A/B.

In the event that the apparatus is simpler in construction in such a way that it does not include the possibility of using a return-air flow E, in which case the exhaust-air flow C is at all times equal to the waste-air flow D, the control method will be simply to control the flows directly in the input-air duct 1 and the waste-air duct 22 in order to control the input-air flow B or/and the waste-air flow D, while keeping, however, the said difference A-D between the fresh-air flow and the waste-air flow, or their ratio A/D, as the criterion.

In principle the method described above can be applied by using components of any type, but preferably both the intake-air mechanism 3 and the outlet-air mechanism 10 are fixed to the heat recovery exchanger 4. Preferably in these mechanisms the closing and control means, such as levers or similar means, are coupled to each other in such a way that, in the outlet-air mechanism 10, a gradual closing of the waste-air flow D will cause a simultaneous gradual opening of the return-air flow E at a corresponding rate, and vice versa, and, in the intake-air mechanism 3, the closing of the fresh-air flow A' to the heat recovery exchanger 4 will cause a simultaneous opening of the fresh-air bypass flow F, and vice versa. It is also advantageous, in order to obtain a reliable measurement, that the input-air and waste-air flows A, D are measured in the pressure apertures of the fans 5, 18, or in the continuations of the apertures. Furthermore, it is preferable to measure the fresh-air flow at the point of connection of the air-conditioning system to the fresh-air duct or inside the air-conditioning system at a point before the filter or after the filter in the direction of the air flow, and that the pressures of the input air and exhaust air B, C are measured inside the air-conditioning system or at the points of connection of the air-conditioning system to the input-air and exhaust-air ducts 1, 9, inside the system.

As mentioned above, the control and closing mechanisms of the fresh-air bypass are coupled to each other as an intake-air mechanism 3 and the exhaust-air and return-air closing and control mechanisms are coupled to each other as an outlet-air mechanism 10. An example of such a control and closing mechanism is illustrated in FIGS. 2–6. The mechanism shown in FIGS. 2–6 has two or more control dampers 31a–c, 38, intended for the control of gas flows and interconnected by means of levers 33, the angle between the fully open and the fully closed positions of the dampers being G or H, which is preferably 45°. The control dampers 31a–c, 38 may in total move over an angle of 2A, since in this case angle A=angle B, i.e., preferably 90°, in which case the position of the dampers is shifted from the first fully closed position 39 via the fully open position 40 to the other fully closed position 41.

Figure 2:
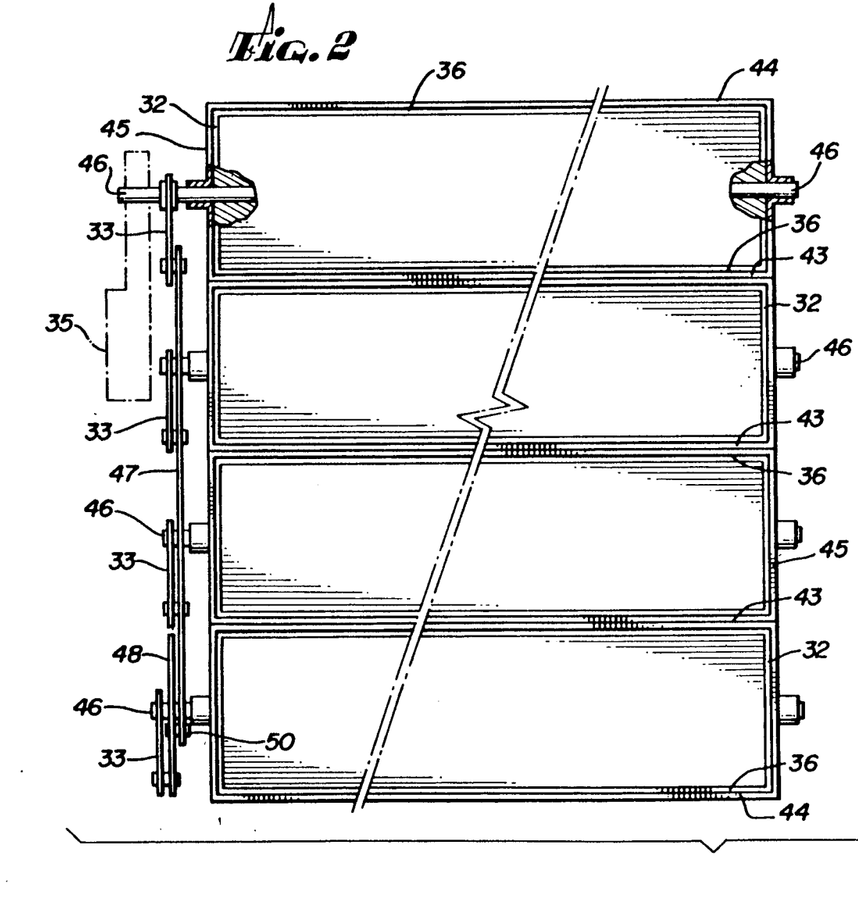
FIG. 2 depicts partially sectional side and plan views of an embodiment of a control and closing device.

The embodiment of FIG. 2 thus has a total of four control ducts for air flows 37a–c and 42, the ducts being in this case separated from one another by partitions 43 and from the exterior by end walls 44 and a side walls 45. The air flows travel through the device in parallel and under the control of the duct side walls 45 and partitions 43 or, respectively the end walls 44. Each control duct thus has preferably one control damper 31a–c or 38, which in the fully open position is parallel to the corresponding air flow, in which case angle $\alpha = 0°$. From this, the control dampers can be turned in one direction, whereupon angle $\alpha$ approaches the angle $\alpha = +G$ of the first closed position, or in the other direction, whereupon the angle $\alpha$ approaches the angle $\alpha = -G$ (i.e. $=H$) of the other closed position.

The apparatus according to FIG. 2 as a whole thus functions as follows:

In the position which closes air flows 37a–c, 42, all the control dampers 31a–c, 38 are in the fully closed position $\alpha = +G$ preferably 45°;

when the control levers 33 are turned to the position 45° or over some other structural angle, the other control dampers 31a–c, with the exception of the control damper 38 of the so-called bypass duct (still fully closed, $\alpha = +G$) are fully open ($\alpha = O$);

when the control levers 33 are turned further over the same 45° or an angle according to some other corresponding structural dimension (thus, for example, in total 0°->90°), the other control dampers 31a–c move further to the other fully closed position ($\alpha = -G = H$) and the control damper 38 of the bypass duct opens into the fully open position ($\alpha = O$).

The closing and control dampers are sealed against the partitions 43 and respectively end walls 44 either by means of sealing flanges or sealing strips 36 and against the side walls 45 by means of sealing flanges or sealing strips 32. A spring 34 or a counterweight ensures that the control damper of the bypass duct remains closed and is air-tight.

The control and closing dampers are turned by mediation of shafts 46 rigidly fastened to the levers 33, each damper turning about its own shaft 46. The opposite ends of the levers 33 are mounted with bearings 60 to a bar 47 of its articulation part 48. A drive device such as a motor 35 is attached to one of the shafts 46 to rotate the said shaft. Through the transmission of the bar 47 also the other shafts 46 mounted with lever 33 to the bar 47 also rotate in the corresponding manner. If the lever 33 is mounted on bearings to the articulation part 48, which for its part is fastened to the bar 47 with a clearance, for example by mediation of a groove 49 in it and a pin 50 in the bar 47, fitted in the groove, the damper 38 on the shaft in question turns only over the extent of that movement of the bar 47 which extends beyond the clearance. In this manner a phase difference is accomplished between the movement of the damper 38 and the movement of the other dampers 31a–c. In the embodiment of FIG. 2, the phase difference or lag is of the magnitude of angle G (i.e. preferably 45°).

Preferably the shafts 46 are located in the middle of the dampers 31 or respectively 38, transversely in relation to the flow, to minimize the moment produce by the flow.

When the control and closing device is applied to the heat recovery unit of ventilation, the unit comprising a plate heat exchanger operating according to the cross flow principle, and its bypass duct, two control and closing devices described above (FIG. 2) are used. This control and closing device unit is shown in FIGS. 3–6. For the sake of clarity, only the control and closing devices are shown in FIGS. 3–6, but the heat exchanger and other conventional components are not shown in FIGS. 3–6.

Figure 3:
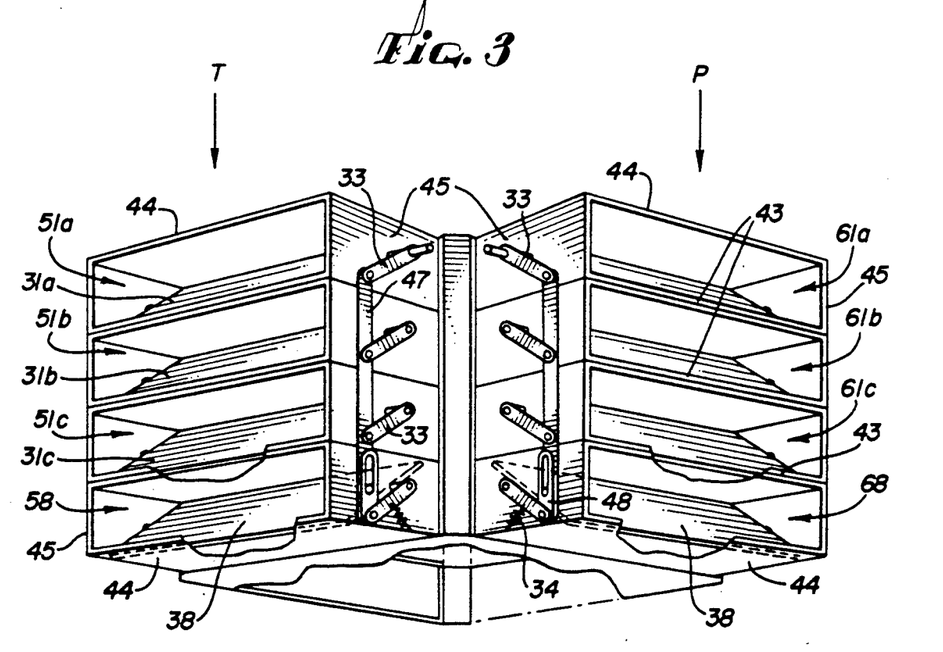
FIGS. 3-6 depict the application of the embodiment depicted in FIG. 2 as a control and closing device of an air-conditioning plant, in the various states of operation of the device.

FIG. 3 depicts a situation in which the air conditioning plant is stopped and the control and closing device is closing the flows of both exhaust air and incoming air. All control dampers 51a–c, 61a–c, 58, 68 are in their fully closed positions.

Figure 4:
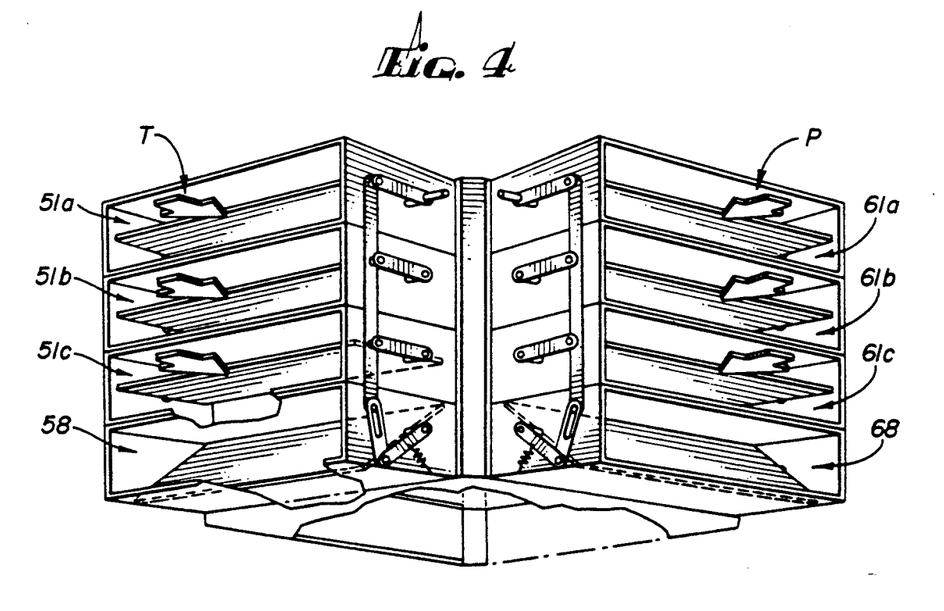

FIG. 4 depicts a situation in which the air conditioning plant is in operation and the exhaust air P and the incoming air T are flowing through the heat exchanger. The control dampers 51a–c, 61a–c located at the heat exchanger are in their fully open position and the control dampers 58, 68 at the bypass duct are in their fully closed position, thereby closing the bypass-flow duct.

Figure 5:
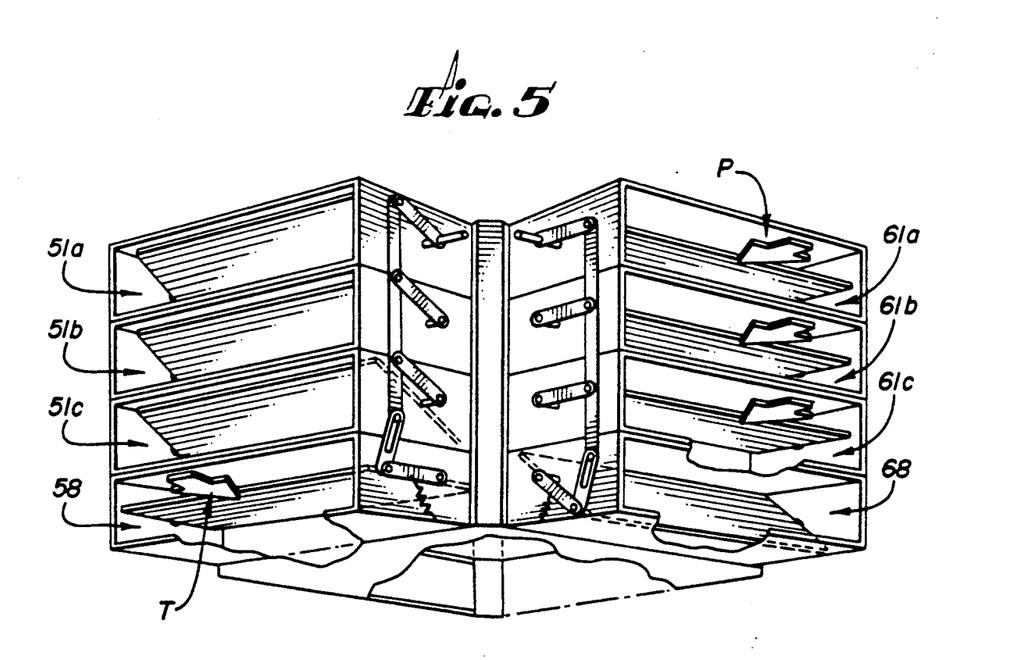

FIG. 5 depicts a situation in which the air conditioning plant is in operation and exhaust air P is flowing through the heat exchanger and incoming air T is flowing through the bypass duct of the heat exchanger. The exhaust-air control dampers 61a–c at the heat exchanger are in their fully open position and the exhaust-air control damper 68 at the bypass duct is in its fully closed position. The inlet air control dampers 51a–c at the heat exchanger are in their fully closed position and the inlet-air control damper 58 at the bypass duct is in its fully open position.

Figure 6:
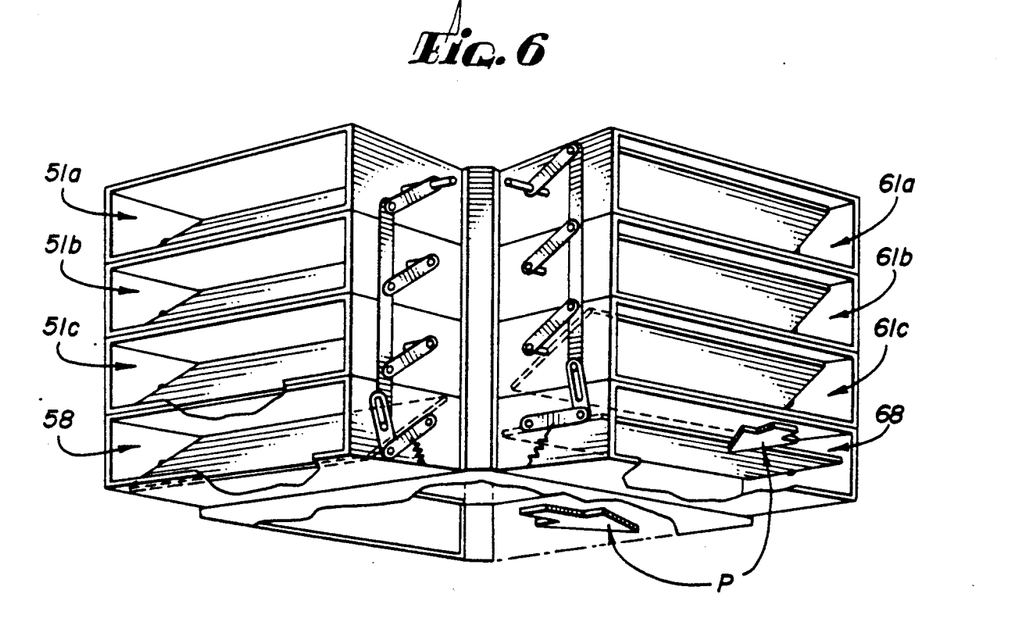

FIG. 6 depicts a situation in which the air conditioning plant is not taking in fresh air. At the heat exchanger all the control dampers 51a–c, 58 for inlet air T are in their fully closed position. At the heat exchanger the control dampers 61a–c for exhaust air P are in their fully closed position and at the bypass duct the exhaust-air control damper 68 is in its fully open position. The air conditioning plant is in this case in circulation-air use.

The control and closing device is, of course, suitable for use also in other than air conditioning plants as a device for dividing gas flows and as a bypass, control and closing device in various apparatus.

Depending on the use, there may be two, three, four or more control and closing ducts. The angle of movement of the control and closing dampers can be selected according to the situation, in which case angle G, i.e. the angel between the fully closed position and the fully open position, may at its smallest be only a few degrees and at its largest 90°. At its most advantageous angle it is within the range 30°-60°, and specifically 45°. The angle between the fully closed positions is typically double the above-mentioned angle, i.e. 2×G in which case angle G≠angle H.

It can, however, be brought that the movement on the two sides of the open position would be asymmetrical or that the closing in one direction would take place against a separate flange, in a manner different from that in the other direction, in which case angle G=angle H and the angle between the fully closed positions would be G+H.

The lever mechanism can also be designed according to need by using various lever and camshaft mechanisms to connect the levers 33 to each other and to the drive apparatus. By applying both an asymmetrical movement or closing of the damper and various lever mechanisms the control and closing device can be made to perform even complicated control functions with only one drive device or with a considerably smaller number of drive devices, and simpler device devices, then is conventional.

We claim:

1. In an air-conditioning system having:
   a heat recovery exchanger;
   fresh-air, input-air, exhaust-air, waste-air and return-air ducts coupled to the heat recovery exchanger;
   a fresh-air bypass duct for bypassing the heat exchanger from the fresh-air duct to the input-air duct;
   a power controllable input-air fan;
   a power controllable waste-air fan;
   closing and control mechanisms for the fresh air duct and the fresh-air bypass duct coupled to each other as an intake-air mechanism
   closing and control mechanisms for the exhaust air duct and the return air duct coupled to each other as an outlet-air mechanism said return-air duct interconnecting said exhaust-air duct and said input-air duct;
   wherein each of the intake- and outlet-air mechanisms have first and second interconnected control damper devices for controlling air flows in the two ducts, respectively, associated with the air mechanism;
   wherein each control damper device is moveable from a first closed position to a second closed position through an open position; and
   wherein the first and second control damper devices of at least one of the air mechanisms are opened out of phase with respect to each other such that the first control damper device is opened from a closed position when the second control damper device is opened from the first closed position and is beginning to move towards the second closed position;
   a method for controlling fresh-air, input-air, exhaust-air, waste-air and return-air flows (A, B, C, D and E, respectively) in the fresh-air, input-air, exhaust-air, waste-air, and return-air ducts, respectively, as well as air pressure in the input-air duct and air pressure in the exhaust-air duct, the method comprising the steps of:
   measuring, substantially continuously, the fresh-air, input-air and waste-air flows in the fresh-air, input-air and waste-air ducts, respectively, and the pressure of the input-air in the input-air duct; and
   upon any one of the fresh-air flow, input-air flow, waste-air flow and input-air pressure measurements deviating from respective preset values, regulating the outlet-air mechanism and the intake-air mechanism to adjust to and maintain substantially at a predetermined constant at least one of the difference (A-D) between the fresh-air flow and the waste-air flow and their ratio (A/D).

2. A method according to claim 1, further comprising the step of, upon a change in the return-air flow (E), adjusting the fresh-air flow (A) be regulating the flow in the input-air duct dependant on the change in the return-air flow (E) so that at least one of the difference (A-D) between the fresh-air flow and the waste-air flow and their ratio (A/D), will remain substantially constant.

3. A method according to claim 1, further comprising the steps of:
   controlling the pressure of the input-air flow (B) by changing the power of the input-air fan to a predetermined value; and
   adjusting the ratio (A/B) of the fresh-air flow to the input-air flow to a predetermined value.

4. A method according to claim 3, further comprising the steps of:
   changing the position of the outlet-air mechanism;
   following the step of changing the position of the outlet-air mechanism, adjusting the pressure of the input-air flow (B) and the ratio (A/B) of fresh-air flow to input-air flow to predetermined values;
   thereafter, adjusting the waste-air flow by adjusting the power of the waste-air fan such that at least one of the difference (A-D) between measurements of the fresh-air flow and the waste-air flow and their ratio (A/D), will become substantially equal to the predetermined constant;
   thereafter, upon at least one of the measurements of the input-air flow (B) and the pressure in the input-air duct having a value which does not deviate from a predetermined value by more than a set deviation, comparing the ratio (A/B) of the measurements of the fresh-air flow to the input-air flow with a predetermined ratio; and
   repeating the steps of adjusting the pressure of the input-air flow and the ratio (A/B), adjusting the waste-air flow and comparing until the ratio (A/B) and at the same time at least one of the difference (A-B) and the ratio (A/D), reach the predetermined values.

5. A method according to claim 1, further comprising the step of
   determining that the exhaust-air flow (C) being approximately equal to the waste-air flow (D), and controlling the input-air flow (B) dependant on the pressure in the input-air duct by changing the power of the input-air fan so that at least one of the difference (A-D) between the fresh-air flow and the waste-air flow and their ratio (A-D), will remain substantially constant.

6. A method according to claim 1, further comprising the steps of:
   measuring the pressure of the exhaust-air and
   upon determining that the exhaust-air flow (C) is approximately equal to the waste-air flow (D), adjusting the exhaust-air flow (C) by adjusting the flow in the waste-air duct by changing the power of the waste-air fan dependant on the exhaust-air pressure so that at least one of the difference (A-D) between the fresh-air flow and the waste-air flow a and their ratio (A/D), will remain constant.

7. A method according to claim 1, further comprising the steps of:
measuring the outside temperature;
upon the waste-air flow (D) having decreased to a value lower than a predetermined value and simultaneously the outside temperature having dropped lower than a predetermined value, adjusting the control dampers of the intake-air mechanism to a bypass position in which the fresh-air flow (A) is in its entirety fresh-air bypass flow (F); and
thereafter, upon at least one of the waste-air flow (D) having risen to a predetermined value and the lapse of a predetermined time from the step of adjusting of the intake-air mechanism to the bypass position (A=F), switching the intake-air mechanism to a position in which no bypass (F) of fresh air occurs.

8. A method according to claim 1, wherein the difference (A-D) between the fresh-air flow and the waste-air flow, and their ratio (A/D), are used alternately, on a time basis, for the regulating step.

9. In an air-conditioning system operable with fresh-air, input-air, exhaust-air, waste-air, fresh-air bypass between said fresh-air and said input-air, and return-air ducts, an apparatus for controlling fresh-air, input-air, exhaust-air, waste-air and return-air between said exhaust-air and said input-air flows (A, B, C, D and E, respectively) in the fresh-air, input-air, exhaust-air, waste-air, and return-air ducts, respectively, as well as air pressure in the input-air duct and air pressure in the exhaust-air duct, the apparatus comprising:
input-air and waste-air flow meters for measuring the input-air and waste-air flows, respectively in the input-air and waste-air ducts, respectively;
input-air and exhaust-air pressure meters for measuring the input-air and exhaust-air pressures, respectively, in the input-air and exhaust-air ducts, respectively;
an input-air fan having air-flow control means for controlling air flow in the input-air duct;
a waste-air fan having air-flow control means for controlling air flow in the waste-air duct;
a fresh-air flow meter for measuring fresh-air flow in the fresh-air duct;
a heat recovery exchanger to which the input-air, waste-air, exhaust-air and fresh-air ducts are coupled;
closing and control mechanisms for the closing and control of the exhaust air and the return air, coupled to form an outlet-air mechanism; and
closing and control mechanisms for fresh air and fresh-air bypass, coupled to form an intake-air mechanism
wherein the fresh-air flow and input-air flow meters and the input-air duct air pressure meter are connected to the input-air flow control, and the waste-air flow meter and the exhaust-air duct air pressure meter are connected to the waste-air flow control; and
wherein the input-air flow and waste-air flow controls are operatively connected to work together and are operatively connected to control the fans and the closing and control mechanisms, the input-air flow and waste-air flow controls having means responsive to a change in one of the quantities measured for causing an adjustment of at least one of the input-air flow (B), the waste-air flow (D), the outlet-air mechanism and the intake-air mechanism so that at least one of the ratio (A/B) of the fresh-air flow to the input-air flow, the difference (A-D) between the fresh-air flow and the waste-air flow and their ratio (A/D), will be substantially at predetermined values.

10. An apparatus according to claim 9, wherein each of the fans has a pressure aperture and wherein the input-air and waste-air flows (B, D) are measured in the pressure apertures of the fans.

11. An apparatus according to claim 9, wherein the air-conditioning system is connected, at a point of connection, to the fresh-air duct, and wherein the fresh-air flow (A) is measuring at the point of connection of the air-conditioning system to the fresh-air duct.

12. An apparatus according to claim 9, wherein the air-conditioning system is connected, at respective points of connection, to the input-air duct and the exhaust-air duct, and wherein the pressures of the input air and the exhaust air (B, C) are measured at its connections to the input-air and exhaust-air ducts.

13. An apparatus according to any one of claims 9-12, wherein the intake-air mechanism and the outlet-air mechanism are coupled to the heat recovery exchanger, and that the closing and control mechanism are coupled to each other and include means responsive to the closing of the waste-air flow (D) for simultaneously opening the return-air flow (E), and vice versa, and include means responsive to the closing of the fresh-air flow (A') to the heat exchanger for opening of the fresh-air bypass flow (F), and vice versa.

14. In an air-conditioning system having:
a heat recovery exchanger;
fresh-air and input-air ducts coupled to each other through the heat recovery exchanger, through which fresh-air and input-air flows are respectively passed;
exhaust-air and waste-air coupled to each other through the heat recovery exchanger, through which exhaust-air and waste-air flows are respectively passed;
a return-air duct coupled to the exhaust-air duct and the input-air duct through which an exhaust-air flow selectively passes to the input-air duct;
a fresh-air bypass duct connected between the fresh-air duct and the input-air duct through which a fresh-air flow selectively passes for selectively bypassing the heat exchanger;
a power controllable input-air fan operatively coupled to the input-air duct;
a power controllable exhaust-air fan operatively coupled to the exhaust duct;
first and second closing and control means for selectively closing and controlling air flows in the fresh air duct and the fresh-air bypass respectively, the first and second closing and control means being coupled to each other as an intake-air mechanism;
third and fourth closing and control means for selectively closing and controlling air flows in the exhaust air duct and the return air duct respectively, the third and fourth closing and control means being coupled to each other as an outlet-air mechanism;
a method for controlling fresh-air, input-air, exhaust-air, waste-air and return-air flows (A, B, C, D and E, respectively) in the fresh-air, input-air, exhaust-air, waste-air, and return-air ducts, respectively, and for controlling the air pressure in the input-air duct and air pressure in the exhaust-air duct, the method comprising the steps of:

measuring the fresh-air, input-air and waste-air flows in the fresh-air, input-air and waste-air ducts, respectively, and measuring the pressure of the input-air in the input-air duct; and determining the deviation from present values of any one of the fresh-air flow, input-air flow, waste-air flow and input-air pressure measurements; and regulating the outlet-air mechanism and the intake-air mechanism to adjust to and maintain substantially at a predetermined constant at least one of the difference (A-D) and the ratio (A/D), in response to the deviation from present values of any one of the fresh-air flow, input-air flow, waste-air flow and input-air pressure measurements.

15. An air-conditioning system comprising:

a heat recovery exchanger;

fresh-air and input-air ducts coupled to each other through the heat recovery exchanger, through which fresh-air and input-air flows are respectively passed;

exhaust-air and waste-air coupled to each other through the heat recovery exchanger, through which exhaust-air and waste-air flows are respectively passed;

a return-air duct coupled to the exhaust-air duct and the input-air duct through which an exhaust-air flow selectively passes to the input-air duct;

a fresh-air bypass duct connected between the fresh-air duct and the input-air duct through which a fresh-air flow selectively passes for selectively bypassing the heat exchanger;

control means for controlling the fresh-air, input-air, exhaust-air, waste-air and return-air flows (A, B, C, D and E, respectively) in the fresh-air, input air, exhaust-air, waste-air, and return-air ducts, respectively, and for controlling the air pressure in the input-air duct and air pressure in the exhaust-air duct, said control means comprising:

a power controllable input-air fan operatively coupled to the input-air duct;

a power controllable exhaust-air fan operatively coupled to the exhaust duct;

first and second closing and control means for selectively closing and controlling air flows in the fresh air duct and the fresh-air bypass respectively, the first and second closing and control means being coupled to each other as an intake-air mechanism;

third and fourth closing and control means for selectively closing and controlling air flows in the exhaust air duct and the return air duct respectively, the third and fourth closing and control means being coupled to each other as an outlet-air mechanism;

measuring means for measuring the fresh-air, input-air and waste-air flows in the fresh-air, input-air and waste-air ducts, respectively, and measuring the pressure of the input-air in the input-air duct;

determining means for determining the deviation from preset values of any one of the fresh-air flow, input-air flow, waste-air flow and input-air pressure measurements; and regulating means for regulating the outlet-air mechanism and the intake-air mechanism to adjust to and maintain substantially at a predetermined constant at least one of the difference (A-D) and the ratio (A/D), in response to the deviation from preset values of any one of the fresh-air flow, input-air flow, waste-air flow and input-air pressure measurements.

16. A system as claimed in claim 15, wherein each of the intake and outlet-air mechanisms have first and second interconnected control damper devices for controlling air flows in the two ducts, respectively, associated with the air mechanism;

wherein each control damper device is moveable from a first closed position to a second closed position through an open position; and wherein the first and second control damper devices of at least one of the air mechanisms are opened out of phase with respect to each other such that the first control damper device is opened from a closed position when the second control damper device is opened from the first closed position and is beginning to move towards the second closed position.

* * * * *